United States Patent [19]

Crandall

[11] 4,221,526
[45] Sep. 9, 1980

[54] WALKIE LOW-LIFT TRUCK WITH TILTABLE PLATEN AND REARWARDLY FOLDABLE LOAD-SUPPORTING WHEEL STRUTS

[75] Inventor: Richard E. Crandall, Boring, Oreg.

[73] Assignee: Cascade Corporation, Portland, Oreg.

[21] Appl. No.: 912,177

[22] Filed: Jun. 5, 1978

[51] Int. Cl.³ .............................................. B60P 1/04
[52] U.S. Cl. .................................. 414/469; 280/43.12
[58] Field of Search ............... 414/469, 474, 476, 482, 414/484, 485; 280/43.12, 43.23

[56] References Cited

U.S. PATENT DOCUMENTS

| | | | |
|---|---|---|---|
| 2,615,677 | 10/1952 | Quayle | 280/43.12 |
| 2,835,400 | 5/1958 | Latzke | 414/476 |
| 4,065,012 | 12/1977 | Rocco | 280/43.12 |

FOREIGN PATENT DOCUMENTS 500853  2/1951  Belgium .............................. 280/43.12

Primary Examiner—Lawrence J. Oresky
Attorney, Agent, or Firm—Chernoff & Vilhauer

[57] ABSTRACT

A walkie low-lift truck with tiltable platen having improved stability and tilting characteristics. The truck comprises a main frame, on which are mounted a drive-steer wheel and motorized propulsion means, and a tiltable load-supporting frame connected to the front of the main frame and supported by load-carrying wheels mounted on rearwardly foldable struts. A load-carrying platen is attached to the load-supporting frame and is movable between a raised position for supporting and transporting a load and a lowered position in which the upper surface of the platen slopes forward and downward from the main frame so that the front edge thereof is in close proximity to the floor to allow a load to be picked up or discharged. The rearwardly foldable struts move the load-carrying wheels rearwardly toward the main frame to lower the platen while a mechanical linkage holds the main frame of the lift truck in a constant attitude with respect to the floor, thereby maximizing the angle of articulation which may be obtained between the main frame and platen. Conversely, as the struts are moved forwardly to unfolded, generally vertical positions to raise the platen, the load-carrying wheels are simultaneously moved forward thereby increasing stability of the truck for transportation of a load.

14 Claims, 4 Drawing Figures

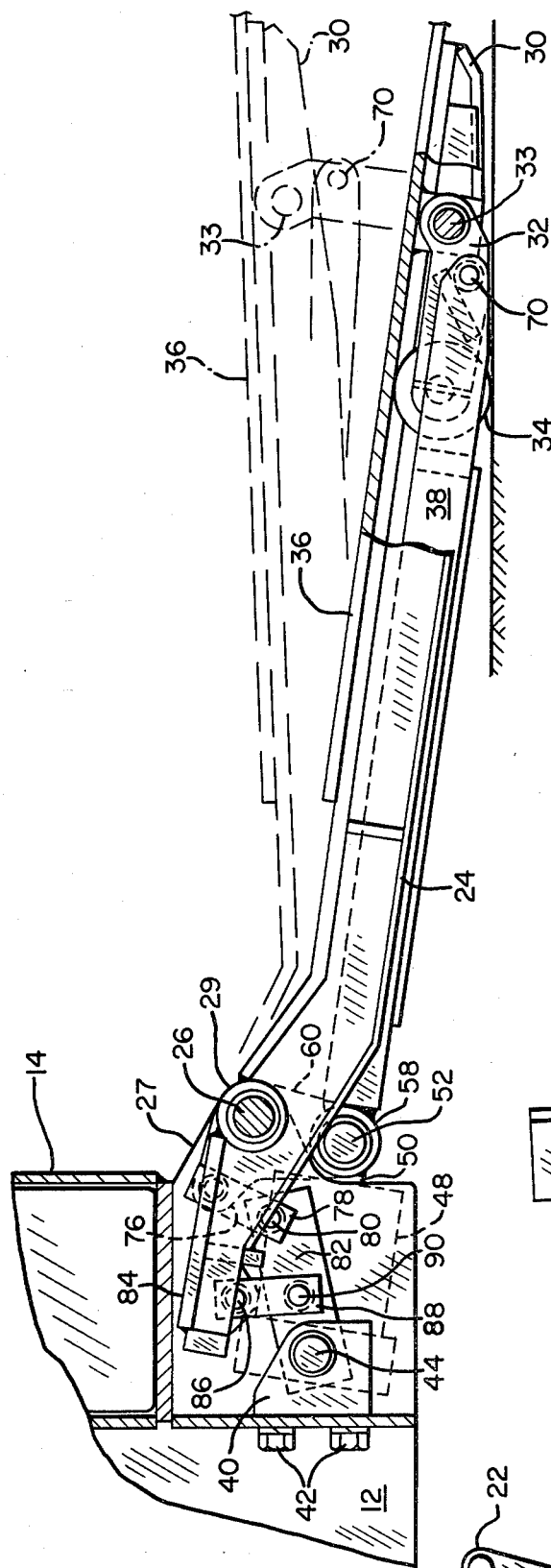
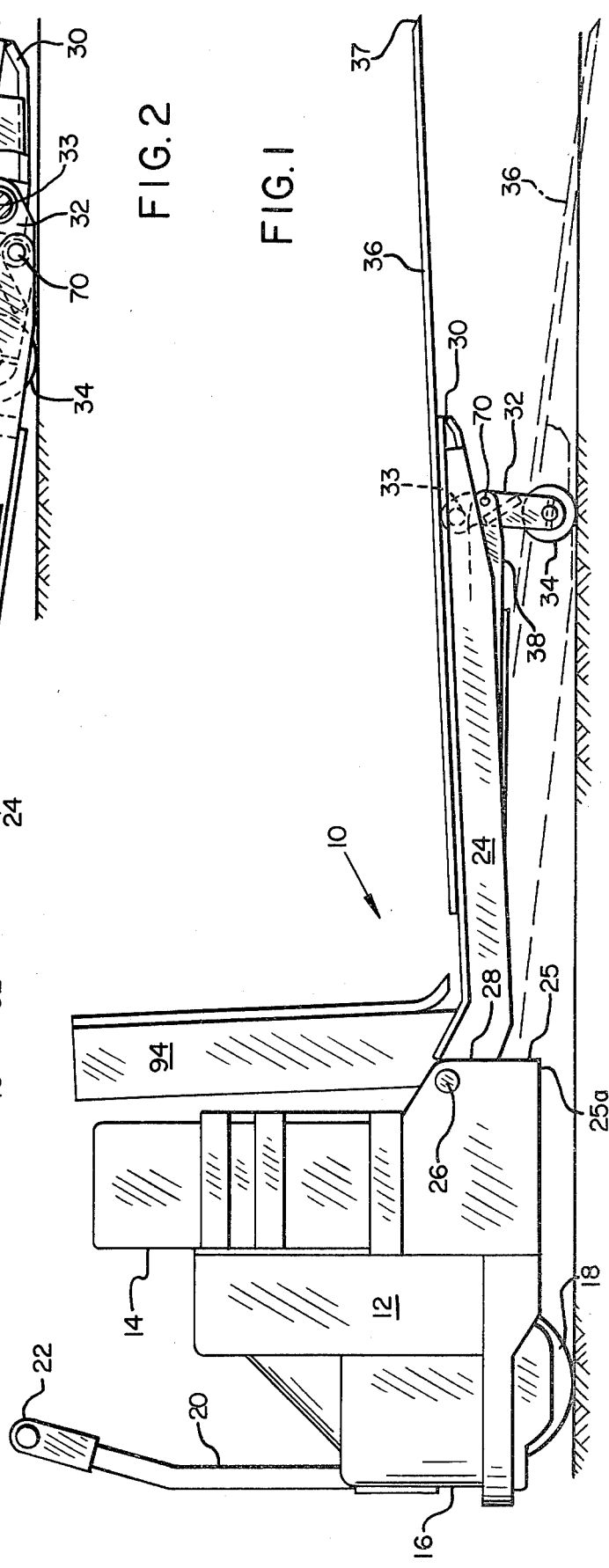
FIG. 1
FIG. 2

WALKIE LOW-LIFT TRUCK WITH TILTABLE PLATEN AND REARWARDLY FOLDABLE LOAD-SUPPORTING WHEEL STRUTS

BACKGROUND OF THE INVENTION

This invention relates to improvements in walkie low-lift trucks. Such materials handling trucks are normally self-propelled and are used to pick up, transport and deposit loads in certain warehouse and loading dock applications where the loads need not be lifted to a great height. In such applications where high lift is not a requirement, the greater maneuverability and lower cost of such low-lift trucks provide a significant advantage over conventional high lift, rider-operated lift trucks.

Structurally, a walkie low-lift truck conventionally comprises a main frame, with which are associated a power supply, motor, controls and a pivotally mounted driver-steer wheel, and a load-carrying structure in the form of a parallel-arm fork or generally laterally disposed platform extending from the front of the main frame and movable between a lowered, loading and discharge position and a raised, load-transporting position. In one general type of low-lift truck, the upper surface of the load-carrying structure is capable of being lowered only to a limited extent such that the structure can be inserted within a space existing between the floor and the bottom of the load, such space being ordinarily provided by a wooden pallet or other similar means for supporting the bottom of the load a distance above the floor. Examples of this type of low-lift truck, usable only with loads supported a spaced distance above the floor, are shown in Loeb U.S. Pat. No. 734,076, Kennedy U.S. Pat. No. 2,299,150, Becker U.S. Pat. No. 3,072,418, Trusock et al U.S. Pat. No. 3,183,989, Nichols U.S. Pat. No. 3,246,713, Goodacre U.S. Pat. No. 3,352,569, Leonard et al U.S. Pat. No. 3,441,287, and Harrison et al U.S. Pat. No. 3,625,534.

In a second general type of low-lift truck, more versatile than the type just described in that it is capable of handling nonpalletized, as well as palletized, loads, the load-carrying structure, particularly in the form of a tiltable platform called a "platen", is arranged to tilt forward while being lowered until a forward edge touches the floor. Thus in the lowered position the platen forms an inclined plane to facilitate loading and discharging of loads supported merely on paper sheets known as "slip sheets". A push-pull mechanism is commonly used with this type of low-lift truck to mechanically pull a slip sheet, and thereby its load, up the inclined plane of the platen for loading, or push the load down for unloading. It will be appreciated that, for the loading of slip sheet-supported loads, it is imperative that the forward edge of the upper surface of the platen be capable of being tilted into close proximity with the floor at the juncture between the slip sheet and the floor to enable the slip sheet to be pulled onto the platen.

In present low-lift trucks having such tiltable platens, the lowering and lifting of the forward edge of the platen is accomplished in different ways. One way is exemplified by the low-lift truck shown in Rigsby U.S. Pat. No. 3,495,730 where load-supporting rollers are reciprocated forwardly and rearwardly through a substantial distance to raise and lower respectively the forward edge of the tiltable load-carrying structure. This type of mechanism has a major drawback in that it cannot provide a sufficient degree of articulation between the tiltable structure and the main frame to satisfy many load-handling conditions. In particular, the degree of elevation provided by extended the rollers forwardly is limited substantially to the diameter of the rollers, which in turn is limited by the available space for storage of the rollers in their retracted position. This limited degree of elevation makes it difficult or impossible for this type of low-lift truck to be used interchangeably for the handling of palletized and nonpalletized loads since the limited degree of elevation provided may be insufficient to elevate a palletized load or, alternatively, insufficient to provide necessary clearance between the pallet and the floor to transport the palletized load over floor surfaces having normal surface variations, changes of slope and the like. Moreover, with respect to the handling of slip sheet-supported loads, it is often necessary to pick up the load while the main frame of the truck is supported on a surface the plane of which is angled with respect to the surface upon which the load is supported. For example, in typical loading dock operations it is common for the bed of a freight-carrying truck to be at a somewhat different elevation than the surface of the dock. In such cases a ramp, sloping either upward or downward from the dock, communicates between the truck bed and dock to enable a lift truck to travel between the two. In attempting to pick up the first, or rearward, loads from a fully loaded truck, the main frame of the low-lift truck is thus normally positioned on the ramp at an angle with the truck bed. If the ramp slopes upwardly from the dock, it will be necessary that the forward edge of the platen be depressed to a level below the plane of the ramp surface so as to contact the truck bed at its interface with the slip sheet. Conversely, if the ramp slopes downwardly from the dock, the forward edge of the platen may need to be elevated substantially just to be able to engage the load initially, and then further elevated in order to raise the load to a transporting position. For the same low-lift truck to be able to accomplish all of the foregoing different maneuvers a higher degree of articulation between the platen and the main frame of the truck, and a concomitant greater range of elevation of the forward edge of the platen, than can be provided by the mere forward and rearward reciprocation of rollers as in the Rigsby device must be provided.

A type of structure which is capable of providing the necessary degree of articulation and range of elevation of a tiltable platen is one wherein the elevation is accomplished by powered rotation of load-supporting struts depending pivotally from a load-supporting frame beneath the platen, on the depending ends of which are mounted load-supporting, floor-engaging wheels or rollers. Strut structures are presently used for elevating the tiltable platens of low-lift trucks, as evidenced for example by Fernstrom et al U.S. Pat. No. 3,392,858 and Rocco U.S. Pat. No. 4,065,012. In the raised position of these platens, the struts extend generally vertically downward so as to maximize the distance between floor and platen. Powered means fold the struts to lower the load-supporting frame and forward edge of the tiltable platen by pivoting the struts in a forward direction, thereby moving the wheels forwardly away from the main frame of the truck. Conversely, the struts are pivoted in the rearward direction to resume a vertical position in order to raise the forward edge of the platen to its load-transporting position, thereby moving the load-supporting wheels rearwardly toward the main frame of the truck. However, in moving rearwardly during the transition from the lowered position to the raised, load-transporting position of the platen, the load-carrying wheels cause a shortening of the wheel base and thereby reductions in load-carrying capacity, stability, tractive effort and steerability of the truck. These reductions are peculiar to the tiltable platen type of low-lift truck because the tiltable platen requires that the location of the load-supporting struts and wheels be a substantial distance rearwardly of the forward edge of the platen to enable the forward edge to be inserted beneath a slip sheet. Such rearward location of the struts and wheels in turn insures that the center of gravity of most loads on the platen will be forward of the wheels, counterbalanced by the weight of the main frame. Thus, as the load-supporting struts and wheels move rearwardly to raise the platen in present tiltable platen type trucks, the load's forward tipping moment about the wheels increases, tending to overcome the counterweight provided by the main frame. This condition can cause the truck to become unstable and unsteerable and to lose tractive effort as a load is raised, despite adequate initial stability, steerability and traction. Thus while a load is being lifted the truck may suddenly tilt forward, pivoting about the axles of the load-carrying wheels and raising the drive wheel from the ground. Even if the drive wheel is not lifted from the ground, the rearward movement of the load-supporting wheels as the load is raised inevitably lessens the portion of the total load carried by the drive wheel, reducing the static stability of the truck in the fore and aft direction and reducing the steering control and tractive effort afforded by the drive wheel.

Conversely, in folding the struts forward to lower the forward edge of the platen, the present tiltable platen type trucks limit the maximum degree of depression of the platen which can be obtained. Such limitation on the depressability of the platen can be particularly unsatisfactory in loading dock operations where the bed of a freight-carrying truck is higher than the surface of the dock, as described above.

Accordingly, what is needed is a low-lift truck, of the type having a tiltable platen, which: (a) provides an improved degree of articulation between the platen and main frame, particularly with respect to depression of the platen; (b) provides a sufficient degree of platen elevation to handle palletized as well as nonpalletized loads; and (c) increases, rather than decreases, the load-carrying capacity, forward stability, steerability and tractive effort of the truck as the load is elevated by the platen.

SUMMARY OF THE INVENTION

All of the aforementioned needs are satisfied by the present invention, which provides a novel operative arrangement in which load-supporting wheels are mounted on rearwardly folding struts which depend from the tiltable load-supporting frame, moving the load-supporting wheels forward and lengthening the wheel base to raise the forward end of the load-carrying surface or platen of the truck and moving the wheels rearward to lower the forward end of the platen. Linkages positively control the relative movement between the load-supporting frame and the main frame of the truck so that the main frame maintains a constant attitude relative to the floor as the platen is lowered and raised, thereby cooperating with the rearwardly folding struts to maximize the degree of articulation between the platen and main frame, and particularly maximize articulation in a direction causing depression of the forward edge of the platen.

In the low-lift truck of the present invention, a horizontally disposed main frame is supported by a drive-steer wheel and carries means for propelling the truck. The rear end of the tiltable load-supporting frame is hingedly connected to the forward end of the main frame and has a load-carrying platen or other generally laterally disposed load-carrying structure mounted thereon. The forward end of the load-supporting frame is supported by elongate load-supporting struts each having an upper end pivotally connected to the load-supporting frame and a lower end having load-carrying wheels rotatably mounted thereon. The struts are pivotable about a transverse axis between a substantially vertical orientation in which the platen is in a raised, preferably rearward tilting position, and a rearwardly displaced folded orientation in which the forward end of the platen is lowered and the load-supporting wheels are closer to the main frame of the lift truck than in the raised position of the platen.

Since the lowered position of the platen is not its load-supporting or transporting position, forward truck stability under this condition is not a significant factor. What is significant in the lowered platen position are the degree of articulation and depressability of the platen relative to the main frame, and these are aided considerably by the rearward position of the load-supporting wheels. In contradistinction, as the struts are rotated forward to lift a load the wheel base is lengthened and the truck's forward stability, capacity, steerability and tractive effort are thereby increased for support and transportation of the load.

The position of the struts is controlled by a reciprocating position control means, comprising control arms connected to the struts powered by a suitable motor such as a hydraulic ram. Mechanical linkages interconnecting the main frame, load-supporting frame and the position control means regulate the angular relationship between the respective frames, so that the attitude of the main frame relative to the floor or other supporting surface remains substantially constant as the platen is lowered or raised. This ensures relative articulation between the frames, rather than mere tilting of the load-supporting frame accompanied by like tilting of the main frame.

It is therefore a principal objective of the present invention to provide a walkie low-lift truck, of the type having a tiltable load-carrying platen, which provides an improved degree of articulation between the platen and main frame resulting in improved depressability of the platen and sufficient platen elevation to handle palletized as well as nonpalletized loads.

It is a further principal objective of the present invention to provide such a low-lift truck wherein the load-carrying capacity, forward stability, steerability and tractive effort of the truck are increased, rather than decreased, during the elevation of a load by the platen.

The foregoing objectives, features and advantages of the present invention will be more readily understood upon consideration of the following detailed description of the invention taken in conjunction with the accompanying drawings.

BRIEF DESCRIPTION OF THE DRAWINGS

FIG. 1 is a simplified side elevation of an exemplary walkie low-lift truck constructed according to the present invention.

FIG. 2 is a fragementary, partially sectional elevation of the truck of FIG. 1 showing the load-supporting frame and platen in the lowered position, with the raised position shown in phantom.

DETAILED DESCRIPTION OF THE PREFERRED EMBODIMENT

Figure 3:
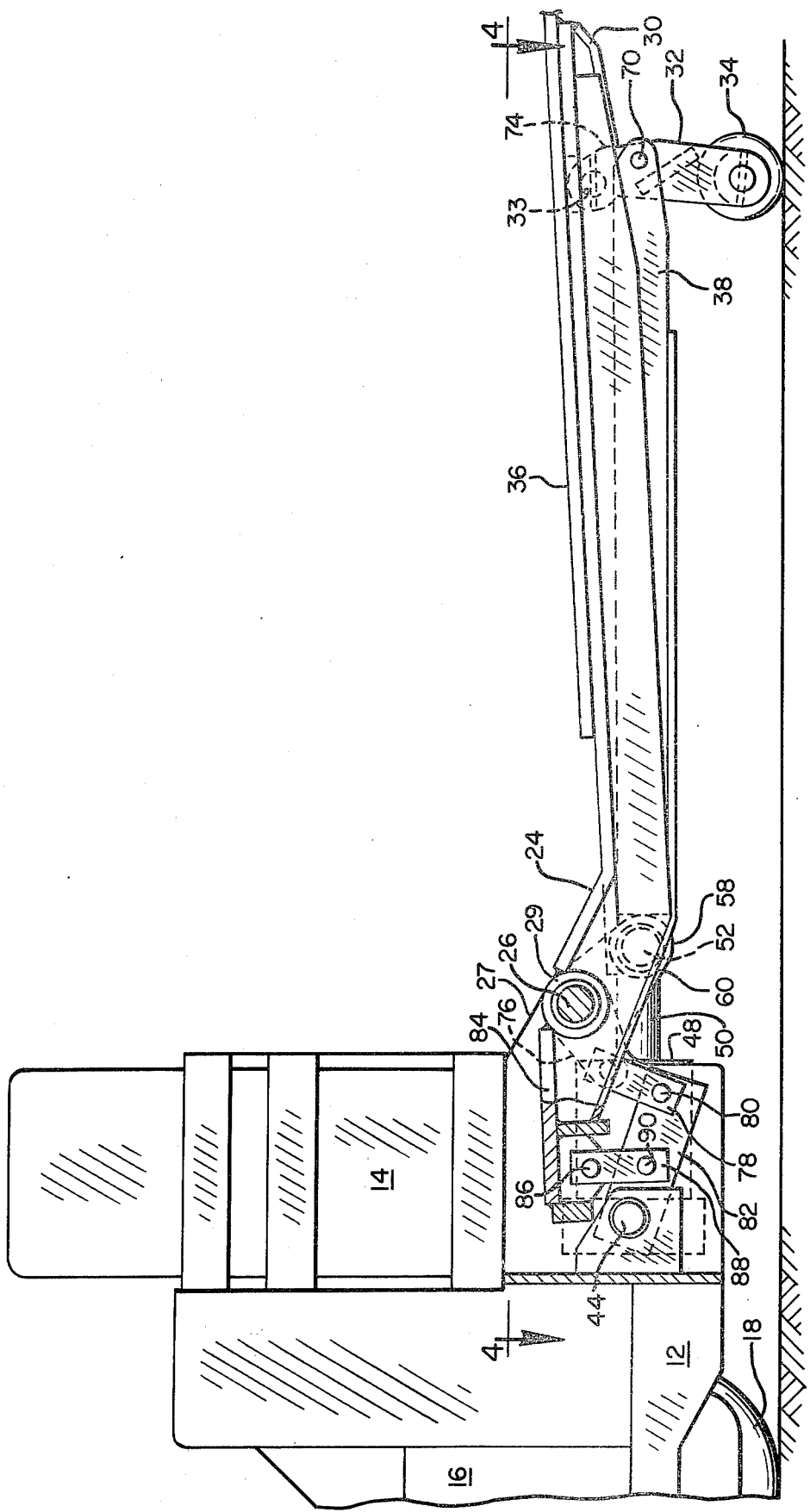
FIG. 3 is a fragmentary, partially sectional side elevation of the truck of FIG. 1 showing the load-supporting structure and platen in the raised position.

Referring to FIG. 1, an exemplary walkie low-lift truck 10 embodying the present invention is seen in side elevation. A main frame 12 oriented generally parallel to the ground carries electric storage batteries in a housing 14, and an electric motor and associated transmission (not shown) contained within a housing 16. A drive-steer wheel 18, powered by the motor, is pivotally mounted on the frame 12 and may be steered by a control arm 20, which includes a control unit 22 at the extremity thereof.

Figure 4:
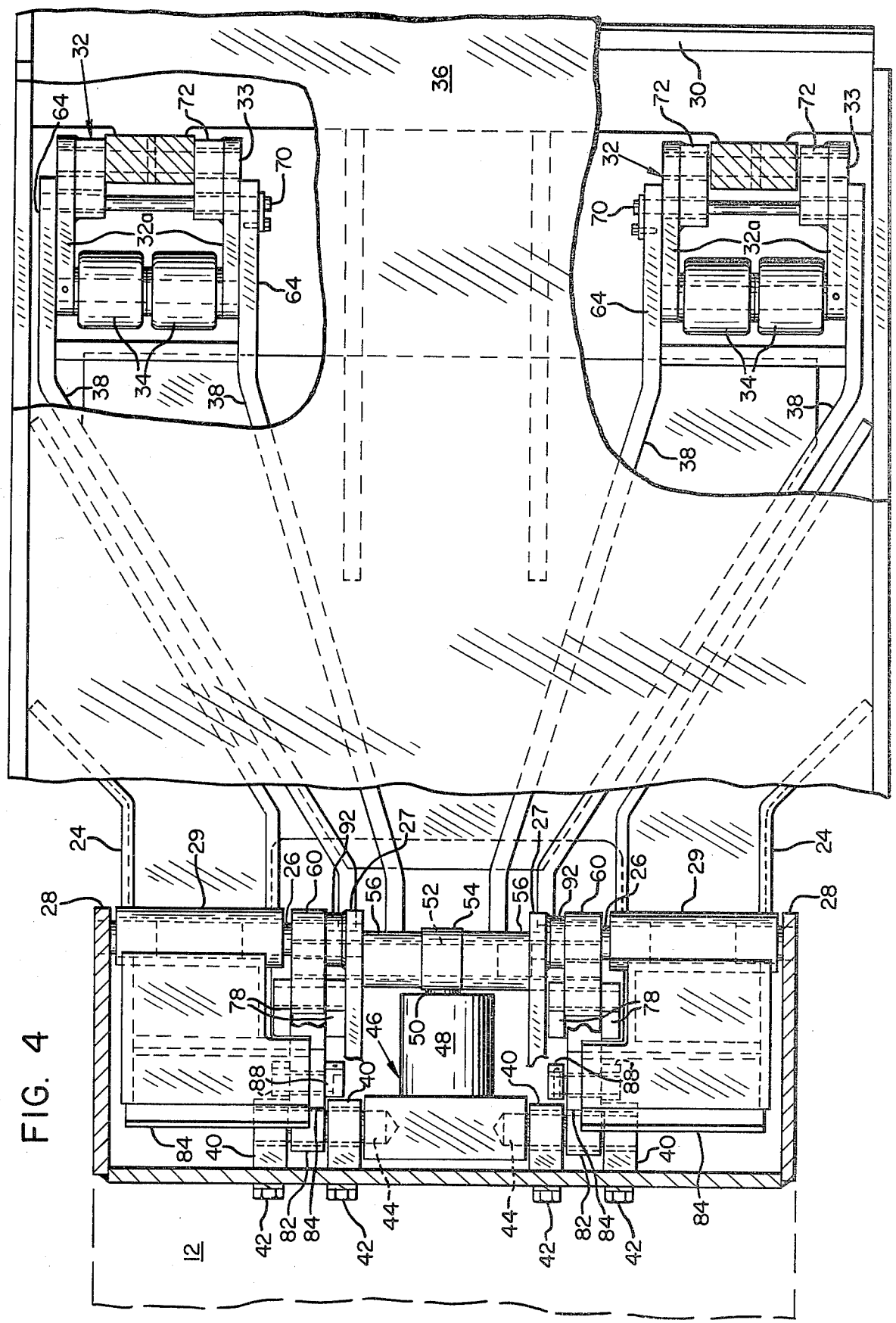
FIG. 4 is a fragmentary, partially sectional plan view of the truck of FIG. 1 showing the load-supporting structure and platen in the lowered position.

With reference also to FIG. 4, a tiltable load-supporting frame 24 is hingedly connected to the forward portion 25 of the main frame 12 by a pair of horizontal shafts 26 laterally spaced apart and supported by inner support brackets 27 and outer support brackets 28. Bearing sleeves 29 of the frame 24 pivot about the horizontal shafts 26 to permit articulation of the frame 24 with respect to the frame 12 between respective raised and lowered positions. A laterally disposed, flat, load-carrying member such as a platen 36 is fixedly mounted to the top of the tiltable load-supporting frame 24 and has a downwardly tapered forward edge 37 to allow a load to easily slide onto the platen when it is lowered.

A front end 30 of the tiltable load-supporting frame 24 is supported by a pair of laterally spaced load-supporting struts 32 pivotally mounted at their upper ends by means of transverse shafts 33 to the frame 24 and having a pair of load-supporting wheels 34 rotatably mounted to their depending ends. As seen in FIG. 4, each strut 32 is a weldment comprising a pair of elongate members 32a joined in a reinforced, parallel arrangement.

A pair of rigidly interconnected, laterally spaced control arms 38 retract rearwardly, by means of a powered linkage to be described hereafter, to rotate each strut 32 rearwardly and move the load-supporting wheels 34 toward the main frame 12. Rearward rotation of the struts, depending upon the degree of rotation, can lower the load-supporting frame 24 and the platen 36 to a maximum depressed position shown in phantom in FIG. 1 wherein the tapered forward edge of the platen is below the plane defined by the bottom surfaces of the drive-steer wheel 18 and load-supporting wheels 34. Mechanical linkages, illustrated in FIGS. 2, 3 and 4, maintain the orientation of the main frame 12 constant with respect to the floor as the load-supporting frame 24 and platen 36 are lowered. Conversely, forward extension of the control arms 38 and resultant forward rotation of the struts, likewise depending upon the degree of rotation, raises the frame 24 and platen 36 to a maximum raised position wherein the platen is at least substantially horizontal and preferably tilts rearwardly toward the main frame 12 as illustrated in FIG. 1, again without changing the orientation of the main frame 12 relative to the floor.

The mechanism for operating the control arms 38 and maintaining the constant attitude of the main frame 12 relative to the floor is shown in FIGS. 2 and 4 with the load-supporting frame 24 in its lowered position, and in FIG. 3 with the load-supporting frame 24 in its raised position. Referring to FIGS. 2, 3 and 4, mounting brackets 40, fixedly attached to the main frame 12 by connectors such as bolts 42, support a pair of coaxial, transversely spaced, horizontally oriented shafts 44 which pivotally mount a hydraulic ram 46 having a cylinder portion 48 adjacent to the main frame 12 and an extensible piston rod 50 extending forwardly from the cylinder portion 48. A cross-shaft 52 extends transversely from a socket 54 fixedly located on the end of the piston rod 50 toward each side of the truck, extending pivotally through a sleeve 56 on a rear end of each pair of control arms 38, and thence pivotally through a lower arm 58 of each of a pair of cranks 60, each crank being mounted rotatably on a respective one of the horizontal shafts 26.

When the piston rod 50 of the hydraulic ram 48 is retracted from its extended position shown in FIG. 3 to the retracted position illustrated in FIGS. 2 and 4, two major actions simultaneously and coordinately occur. First, the cross-shaft 52 is pulled rearward and the cross-shaft in turn pulls the control arms 38 rearward. Each pair of control arms 38 is connected to one of the load-supporting struts 32 by means of a yoke having a pair of yoke arms 64 pivotally connected to the respective strut 32 by a shaft 70. Therefore, when the ram 48 pulls the control arms 38 rearward, the struts 32 rotate from a generally vertical position, wherein the load-supporting frame 24 is in its raised position, to a folded position wherein the load-supporting frame 24 is in its lowered position.

Second, as the piston rod 50 is retracted the cross-shaft 52 pulls rearward upon each of the lower arms 58 of the cranks 60, causing the cranks 60 to rotate about the shafts 26. This rotation, clockwise as seen in FIGS. 2 and 3, causes an upper arm 76 of each crank 60 to move upward. Each upper crank arm 76 is connected pivotally to a pair of forward connecting links 78 which depend from the upper arm 76 and are pivotally connected at their lower ends to an outer pivot joint 80 on a respective one of a pair of elongated idler levers 82. These forward connecting links 78 are arranged so as to straddle both the idler lever 82 and the upper crank arm 76. Each of the idler levers 82 extends rearwardly to a pivotal interconnection with the main frame 12 by means of a respective pivot shaft 44, and thus pivots upward about the shaft 44 in unison with the clockwise rotation of the respective crank 60. A pair of rearward extension portions 84 of the tiltable load-supporting frame 24, extending toward the main frame beyond the respective bearing sleeves 29 of the frame 24, each connect pivotally to a respective idler lever 82 by means of straddling rear connecting links 88 connecting an inner pivot joint 90 of the idler lever with a respective pivot joint 86 of each rearward extension portion 84. Thus, as each idler lever 82 pivots upward about the respective shaft 44 in response to the clockwise rotation of the cranks 60 the idler levers forcibly cause relative pivoting between the load-supporting frame 24 and main frame 12 in a direction tending to tilt the load-supporting frame downward with respect to the main frame.

Conversely, extension of the ram 48 returns the frame 24 to its raised position by a reversal of the actions described in the previous two paragraphs. A boss 92 attached to an outer side of each inner support bracket 27 provides lateral support for the cranks 60 and clearance for the inner member of each pair of connecting links 78 and 88 during the above-described motions.

From the foregoing it will be appreciated that the combination of the cranks 60, the connecting links 78 and 88, the idler levers 82 and the rearward extension portions 84 of the load-supporting frame 24 collectively form a mechanical linkage variably regulating the angular relationship between the main frame 12 and load-supporting frame 24 in response to the degree of rotation of the load-supporting struts 32. The control arms 38 proportionally coordinate the angular movement of the cranks 60 with that of the struts 32, which angular movement is proportionately reduced by the idler levers 82 to provide a lesser angular movement of the load-supporting frame 24 relative to the main frame 12. Accordingly, as the load-supporting struts 32 rotate forward or rearward as the case may be, to raise or lower the load-supporting frame 24, the foregoing linkage forcibly causes a corresponding angular change between the frame 24 and the main frame 12 to maintain the attitude of the main frame 12 substantially constant with respect to the surface upon which the truck is supported.

It is important to note that in lowering the frame 24, the linkage accomplishes this objective without extending below the bottom 25a (FIG. 1) of the front of the main frame, thereby enabling the truck to pick up or discharge loads in locations not accessible to trucks not having such a linkage, as when the drive-steer wheel 18 and load-supporting wheels 34 respectively straddle a hump in the floor or straddle the upper end of a ramp leading downward from a loading dock during load engagement or discharge.

The low-lift truck of the invention may also incorporate a conventional push-pull mechanism 94 mounted at the rearward end of the load-supporting frame 24, as shown in simplified form in FIG. 1, extensible and retractable by means of a pantograph linkage for mechanical assistance in moving a slip sheet-supported load onto or off of the load-carrying platen 36.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a low-lift truck comprising a main frame having a drive-steer wheel and a drive motor for said wheel mounted thereon, a tiltable load-supporting frame having a laterally extending load-carrying surface pivotally connected to said main frame by a hinged connection such that said load-supporting frame articulates with respect to said main frame between a raised, generally horizontal position and a lowered position tilting downward from said main frame, and elongated load-supporting struts depending pivotally from said load-supporting frame having load-carrying wheels rotatably mounted at the depending ends thereof, the improvement which comprises powered means connected to said struts for selectively moving said struts between a substantially vertical position, in which said load-supporting frame is in said raised position, and a folded position wherein said load-supporting frame is in said lowered position and said load-carrying wheels are closer to said main frame than when said struts are in said vertical position, and linkage means interconnecting said main frame, said load-supporting frame and said struts for maintaining said main frame in a substantially constant attitude with respect to the surface upon which said truck is supported while said load-supporting frame moves between said raised and lowered positions respectively in response to the movement of said struts, said linkage means comprising means operatively interconnecting said struts with a portion of said load-supporting frame adjacent said hinged connection for forcibly causing relative pivoting between said load-supporting frame and said main frame about said hinged connection in a direction tending to tilt said load-supporting frame downward with respect to said main frame in response to the movement of said struts and load-carrying wheels in a direction toward said main frame.

2. The apparatus of claim 1 wherein said portion of said load-supporting frame extends toward said main frame from said hinged connection, said linkage means comprising crank means pivotally mounted upon said main frame operatively interconnecting said struts with said portion of said load-supporting frame, said crank means including means for forcibly urging said portion of said load-supporting frame upward with respect to said main frame in response to the movement of said struts and load-carrying wheels in a direction toward said main frame.

3. The apparatus of claim 2 wherein said linkage means includes means interconnecting said crank means with said portion of said load-supporting frame for pivoting said load-supporting frame with respect to said main frame through an angle which is less than the angle through which said crank means is simultaneously pivoted with respect to said main frame during the movement of said struts and load-carrying wheels.

4. The apparatus of claim 3 wherein said linkage means comprises an elongated idler lever pivotally connected at one end to said crank means and at its other end to said main frame, said portion of said load-supporting frame being connected to said idler lever at a point intermediate said ends of said idler lever.

5. In a low-lift truck comprising a main frame having a rear end and a front end, a drive-steer wheel and a drive motor for said wheel mounted adjacent the rear end of said main frame, a tiltable load-supporting frame having a rear end and a front end, the rear end of said load-supporting frame being pivotally connected by a hinged connection to the front end of said main frame such that said load-supporting frame articulates with respect to said main frame between a raised, generally horizontal position and a lowered position tilting downward from said main frame, a plurality of load-carrying wheels supporting the front end of said load-supporting frame and powered height control means associated with said load-carrying wheels and said load-supporting frame for controllably varying the height of the front end of the load-supporting frame, the improvement which comprises movable powered articulation control means, connected to said height control means and interconnecting said main frame with said load-supporting frame, for exerting a force on said load-supporting frame, in addition to forces exerted through any of said load-carrying wheels, for forcibly pivoting said load-supporting frame downwardly with respect to said main frame about said hinged connection in response to the lowering of the front end of said load-supporting frame.

6. The apparatus of claim 5 wherein said articulation control means extends downward substantially no lower than the bottom of the front end of said main frame when said load-supporting frame is in said lowered position.

7. The apparatus of claim 5 wherein said height control means includes elongated load-supporting struts depending pivotally from said load-supporting frame and having said load-carrying wheels rotatably mounted on the depending ends of said struts, said articulation control means comprising means operatively interconnecting and struts with a portion of said load-supporting frame adjacent said hinged connection.

8. The apparatus of claim 5 wherein a portion of said load-supporting frame extends toward said main frame from said hinged connection, said articulation control means comprising crank means pivotally mounted upon said main frame operatively interconnecting said height control means with said portion of said load-supporting frame, said crank means including means for forcibly urging said portion of said load-supporting frame upward with respect to said main frame in response to the lowering of the front end of said load-supporting frame.

9. The apparatus of claim 8 wherein said articulation control means includes means interconnecting said crank means with said portion of said load-supporting frame for pivoting said load-supporting frame with respect to said main frame through an angle which is less than the angle through which said crank means is simultaneously pivoted with respect to said main frame during the lowering of the front end of said load-supporting frame.

10. The apparatus of claim 9 wherein said articulation control means comprises an elongated idler lever pivotally connected at one end to said crank means and at its other end to said main frame, said portion of said load-supporting frame being connected to said idler lever at a point intermediate said ends of said idler lever.

11. The apparatus of claim 5 wherein said load-supporting frame has a laterally extending load-carrying surface and said height control means comprises means for lowering a portion of said load-carrying surface below a plane defined by the bottom surfaces of said load-carrying wheels and drive-steer wheel.

12. In a low-lift truck comprising a main frame having a drive-steer wheel and a drive motor for said wheel mounted thereon, a tiltable load-supporting frame having a laterally extending load-carrying surface pivotally connected to said main frame by a hinged connection such that said load-supporting frame articulates with respect to said main frame between a raised, generally horizontal position and a lowered position tilting downward from said main frame, and elongated load-supporting struts depending pivotally from said load-supporting frame having load-carrying wheels rotatably mounted at the depending ends thereof, the improvement which comprises powered means connected to said struts for selectively moving said struts between a substantially vertical position, in which said load-supporting frame is in said raised position, and a folded position wherein said load-supporting frame is in said lowered position and said load-carrying wheels are closer to said main frame than when said struts are in said vertical position, and linkage means interconnecting said main frame, said load-supporting frame and said struts for maintaining said main frame in a substantially constant attitude with respect to the surface upon which said truck is supported while said load-supporting frame moves between said raised and lowered positions respectively in response to the movement of said struts, said load-supporting struts having upper ends pivotally connected by pivotal mounts to said load-supporting frame and said powered means including control arm means for moving said struts, said control arm means being pivotally connected to said struts at points on said respective struts located intermediate said pivotal mounts and said depending ends of said struts respectively.

13. The apparatus of claim 5 including selectively extensible and retractable fluid ram means powering said height-control means and said movable articulation control means for raising the front of said load-supporting frame by extension of said ram means and forcibly pivoting said load-supporting frame downwardly with respect to said main frame by retraction of said ram means.

14. The apparatus of claim 12 wherein said powered means comprises means for lowering a portion of said load-carrying surface below a plane defined by the bottom surfaces of said load-carrying wheels and drive-steer wheel.

* * * * *